(12) United States Patent
Bergeron et al.

(10) Patent No.: US 9,157,729 B1
(45) Date of Patent: Oct. 13, 2015

(54) LIGHT SENSOR FACILITATED INSERT THICKNESS DETECTION SYSTEM

(71) Applicant: DST OUTPUT WEST, LLC, El Dorado Hills, CA (US)

(72) Inventors: Adam Bergeron, South Windsor, CA (US); Fladorik Hima, Wethersfield, CT (US); Joel Lund, Westfield, MA (US)

(73) Assignee: DST OUTPUT WEST, LLC, El Dorado Hills, CA (US)

( * ) Notice: Subject to any disclaimer, the term of this patent is extended or adjusted under 35 U.S.C. 154(b) by 0 days.

(21) Appl. No.: 14/152,674

(22) Filed: Jan. 10, 2014

Related U.S. Application Data

(60) Provisional application No. 61/750,927, filed on Jan. 10, 2013.

(51) Int. Cl.
  *G01B 11/28*    (2006.01)
  *G01B 11/06*    (2006.01)
  *B25J 15/00*    (2006.01)

(52) U.S. Cl.
  CPC .............. *G01B 11/06* (2013.01); *B25J 15/0028* (2013.01)

(58) Field of Classification Search
  USPC ................................................. 356/625–637
  See application file for complete search history.

(56) References Cited

U.S. PATENT DOCUMENTS

| | | |
|---|---|---|
| 3,221,171 A | 11/1965 | Locher |
| 3,341,774 A | 9/1967 | Dyben |
| 3,471,780 A | 10/1969 | Beddows |
| 3,519,922 A | 7/1970 | Hick |
| 3,523,246 A | 8/1970 | Hall |
| 4,006,411 A | 2/1977 | Akagawa |
| 4,063,167 A | 12/1977 | Duly |
| 4,071,820 A | 1/1978 | Mushinsky |
| 4,086,528 A | 4/1978 | Walton |
| 4,130,796 A | 12/1978 | Shum |
| 4,208,625 A | 6/1980 | Piso |
| 4,284,947 A | 8/1981 | Walton |
| 4,311,958 A | 1/1982 | Aeppli |
| 4,706,014 A | 11/1987 | Fabbri |
| 4,710,701 A | 12/1987 | Strentz |
| 4,785,336 A * | 11/1988 | McComb et al. ............. 356/632 |
| 5,647,583 A | 7/1997 | Emigh et al. |

* cited by examiner

*Primary Examiner* — Tri T Ton
(74) *Attorney, Agent, or Firm* — James M. Ritchey

(57) ABSTRACT

A light sensor-containing apparatus for detecting the thickness of inserts placed within a mailer including a picker arm, movable picker jaw that pivots during an insert gripping process, a target plate having a light reflective surface and secured to the picker arm end that moves when gripping an insert, and a light sensor mounted to the picker arm that emits a light beam and receives a reflected light beam that is reflected back from the light reflective surface to establish the thickness of the insert as controlled by associated computer programming is presented.

12 Claims, 10 Drawing Sheets

LIGHT SENSOR FACILITATED INSERT THICKNESS DETECTION SYSTEM

CROSS-REFERENCE TO RELATED APPLICATIONS

This application claims priority to U.S. provisional patent application Ser. No. 61/750,927 filed on Jan. 10, 2013, incorporated herein by reference in its entirety.

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

The invention pertains generally to an apparatus and method for measuring a thickness of a sheet of material, usually paper or an insert that is to be placed into a mailing envelope that contains one or more inserts. More particularly, the subject invention is a device, system, and method which are utilized with a mail inserter machine that comprises an electronic light sensor that measures distance traveled of a target object that is linked via a fulcrum to an insert hopper picking jaw to ascertain a thickness of an insert material held in the jaw picking device. Included is a measurement stored into a processor for comparison as each individual insert is subsequently pulled/picked, measured by the sensor, and compared to the original. Programming allows for a set range or percentage variance of the material and based upon the measurement and the allowed variance, an output to the machine control is provided for an acceptable insert pick detection, a missed insert pick detection, or a double insert pick detection.

2. Description of Related Art

Various devices and methods have been developed to detect the thickness of materials passing a measurement detection point at low to high speeds. Many of these procedures were directed to determining thickness variations in a continuous piece of thread or yarn. Other methods were used with continuous sheets of materials. Some attempted to record the passage of turbine blades at high velocities. These approaches generally rely on detecting a signal generated by the material passing near a detection element, but are often subject to numerous errors due to uncorrected, uncorrectable, or improperly corrected signal generation and analysis.

Both electrically conducting and non-conducting materials have had their thicknesses measured by various techniques. However, due to inherent deficiencies in these prior capacitance techniques, variations in surrounding air, machine, and measured material temperatures, machine vibrations, random electronic drift, and like sources of error were not easily corrected or even noticed and introduced inaccuracy in the determined material thicknesses. Light sensor measurements are not subject to such difficulties.

Disclosed in U.S. Pat. No. 3,221,171 is a method and apparatus for measuring the denier or fineness of yarn or thread using photosensitive or capacitive means. The yarn forms part of the dielectric between detection plates or the yarn varies the amount of light directly detected by a receiver as the yarn passes directly through a light beam traveling between an emitter and receiver. Simplistic circuits produce measurable voltage fluctuations upon yarn thickness variations.

U.S. Pat. No. 3,341,774 relates a capacitance detector having a transmitter connected to one plate and a receiver connected to another plate. This device eliminates the grounding for one of the detection plates and indicates the drawbacks surrounding grounded detectors.

Delineated in U.S. Pat. No. 3,471,780 is a capacitance thickness gauge comprised of a charged sensing plate sandwiched between primary and secondary grounded plates. The technique claims to correct for moisture content in the measured material and atmosphere. A capacitance meter is employed to monitor variations in the dielectric.

Described in U.S. Pat. No. 3,519,922 is an apparatus for detecting abrupt changes in the thickness of sheet materials. Two sequentially spaced capacitance detectors having an even thickness material passing between them produce similar capacitances. However, if a sudden material thickness change occurs, a difference in dielectrics between the two capacitance detectors is noted.

U.S. Pat. No. 3,523,246 shows a method and apparatus for testing a laminar material for irregularities of thickness. The tested laminar material must be at least partly conductive of electricity. An alternating potential difference is applied to the material to be tested between two positions. Recorded potential variations between these two positions reflect thickness deviations.

Presented in U.S. Pat. No. 4,006,411 is a static capacitance type sensor for detecting yarn denier. When yarn is passed through a sensing condenser, the static capacitance is varied and the circuit deviates from the series-resonant position and a variable input will appear at the input terminal of an amplifier.

A blade tip clearance measuring apparatus is shown in U.S. Pat. No. 4,063,167. Rotating turbine blade tips alter the capacitance of a detection probe as they pass nearby. Also, rotating blades are detected by a capacitance sensor described in U.S. Pat. No. 4,071,820. The '820 patent illustrates the general principle of employing a non-contacting sensor that is responsive to an energy manifestation as a function of the spacing between the sensor and the object being measured.

U.S. Pat. No. 4,086,528 discloses a capacitance detector system having one capacitance transducer with at least one capacitor that varies in capacitance in accordance with changes in the dimensions of the quantity being measured and one reference capacitor.

A calibrating and measuring circuit for a capacitive probe type instrument is depicted in U.S. Pat. No. 4,130,796. This device is for gauging the texture of a conducting surface and contacts with the surface to be measured.

U.S. Pat. No. 4,208,625 reveals a capacitive measuring system with automatic calibration. The automatic calibration stems from a comparison routine between an absolute measurement for say the denier of a yarn and a prescribed datum. Continuous monitoring of the characteristics of a moving filament is achieved. Grounding is not associated with the detection capacitor plates since a sensor head forming a capacitance bridge is employed and driven by a signal generator.

The size and shape of a body is determined by the device related in U.S. Pat. No. 4,284,947. The body to be measured is rolled between the plates of capacitors, the dielectric constant of which is thereby altered.

Shown in U.S. Pat. No. 4,311,958 is a capacitive thread motion detector and thread motion stopping device. An alternating current signal is generated during the passage of a thread, with inherent physical irregularities, through a capacitive element, but when the thread breaks or stops the signal disappears and the associated machine is halted.

U.S. Pat. No. 4,706,014 discloses an improved device for measuring the diameter of a dielectric fiber. Key to this invention is the particular shaping of the capacitor plates, such as to allow electric field reductions at the edges to be compensated for and hence capacitance measurements to be unaffected by fiber vibrations.

A capacitive cell for continuous measurement of the linear mass of textile products is described in U.S. Pat. No. 4,710,701. Two identical air capacitors are employed in this device. One capacitor has air as the dielectric and the other has a continuous moving thread. Thread irregularities are detected by comparing capacitance differences between the two capacitors.

U.S. Pat. No. 5,647,583 disclosed a capacitance facilitated system for measuring the thickness of a picked item. The system is utilized to singulate sheets from a stack of sheets.

BRIEF SUMMARY OF THE INVENTION

An object of the present invention is to produce an insert thickness detection system and method of use.

A further object of the subject invention is to create a thickness measurement system and method of use that reliably reads the thickness of sheets of material such as paper, plastic, and the like, including mailing insert sheets held within the jaws of a gripper arm assembly.

An additional object of the present invention is to describe a thickness measuring system and method of use for determining the thickness of a picked insert and determining if the picked insert is a missed insert, a single insert, or multiple inserts by comparing the insert's thickness to a recorded standard insert thickness value.

Still a further object of the present invention is to produce a light sensor facilitated thickness measuring device and method of use that yields reliable thickness measurements.

Yet a further object of the subject invention is to construct an improved light sensor facilitated thickness measuring device and method of use that is relatively inexpensive to fabricate and employ and is reliable.

The subject invention, a device for detecting the thickness of an insert that is picked for inclusion in a mailing envelope, comprises: a picker jaw assembly that includes a picker arm having first and second ends; an insert gripping picker jaw mounted to the picker arm first end having a first fixed jaw member and a second movable jaw member; a fulcrum point about which the second movable jaw member pivots during an insert gripping process between a closed empty position and an insert gripping open position; a target plate having a light reflective surface and secured to the second picker arm end; picker jaw-to-target plate attachment means whereby when the second movable jaw member moves when gripping the insert the target plate shifts in position; and a light sensor mounted proximate the picker arm second end that emits a light beam and receives a reflected light beam that is reflected back from the light reflective surface. Further comprising the subject invention is a controller having programming that correlates the target plate position movement into a thickness determination for the insert gripped by the picker jaw, wherein the programming comprises the steps: calculating an empty reading value; measuring a thickness of the selected insert; resetting data when a new job is started or when an operator resets the gripper arm; calculating a setpoint for the thickness measurements; determining insert thickness limits; generating various problem alarms; and creating an interface utilized to notify the operator as to what is occurring in the thickness measurement process.

Other objects, advantages, and novel features of the present invention will become apparent from the detailed description that follows, when considered in conjunction with the associated drawings, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

Figure 3:
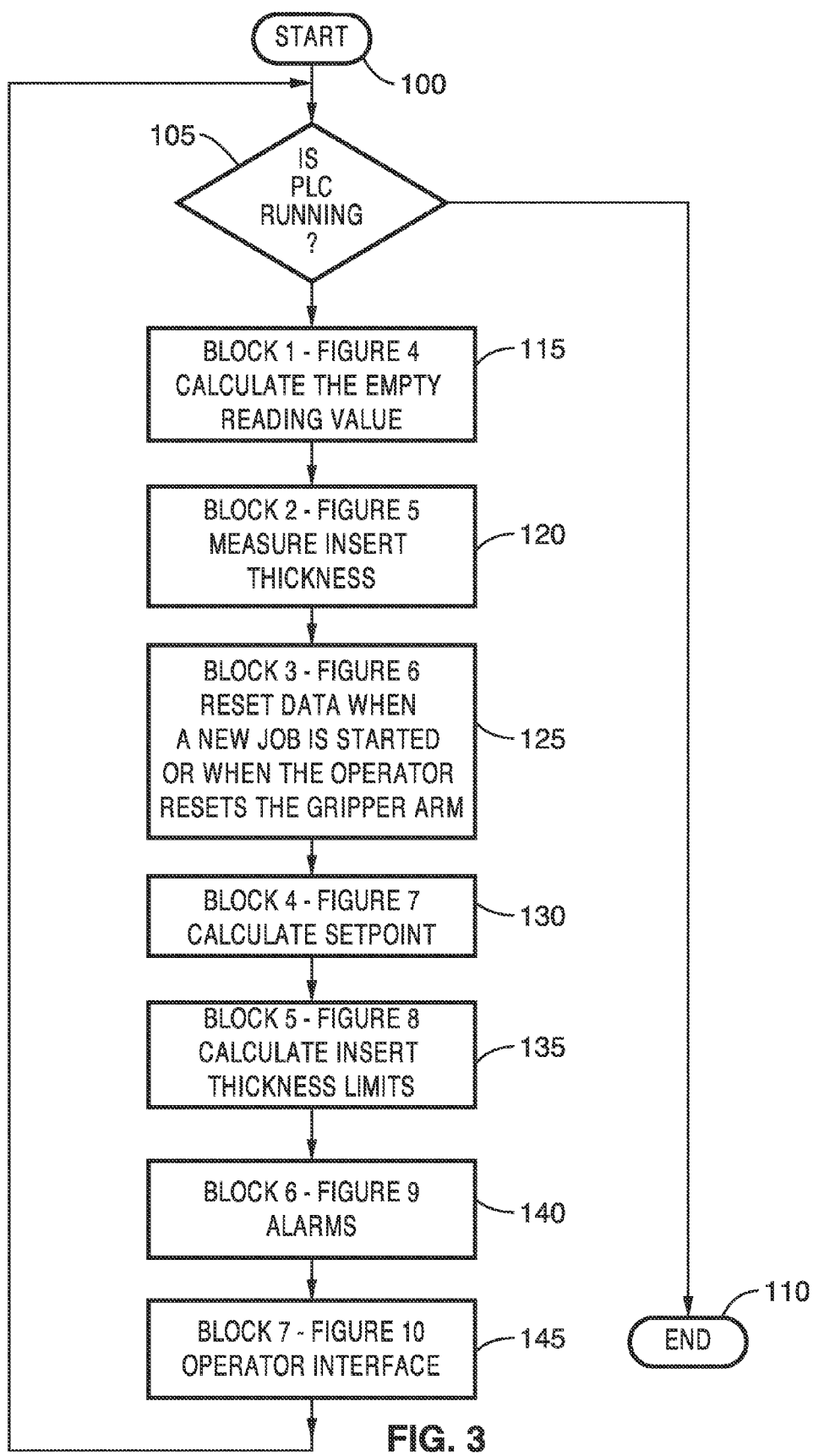
FIG. 3 is a more specific flow diagram than that shown in FIG. 1 and indicates the various subroutines that comprise the subject thickness determination process.
Figure 4:
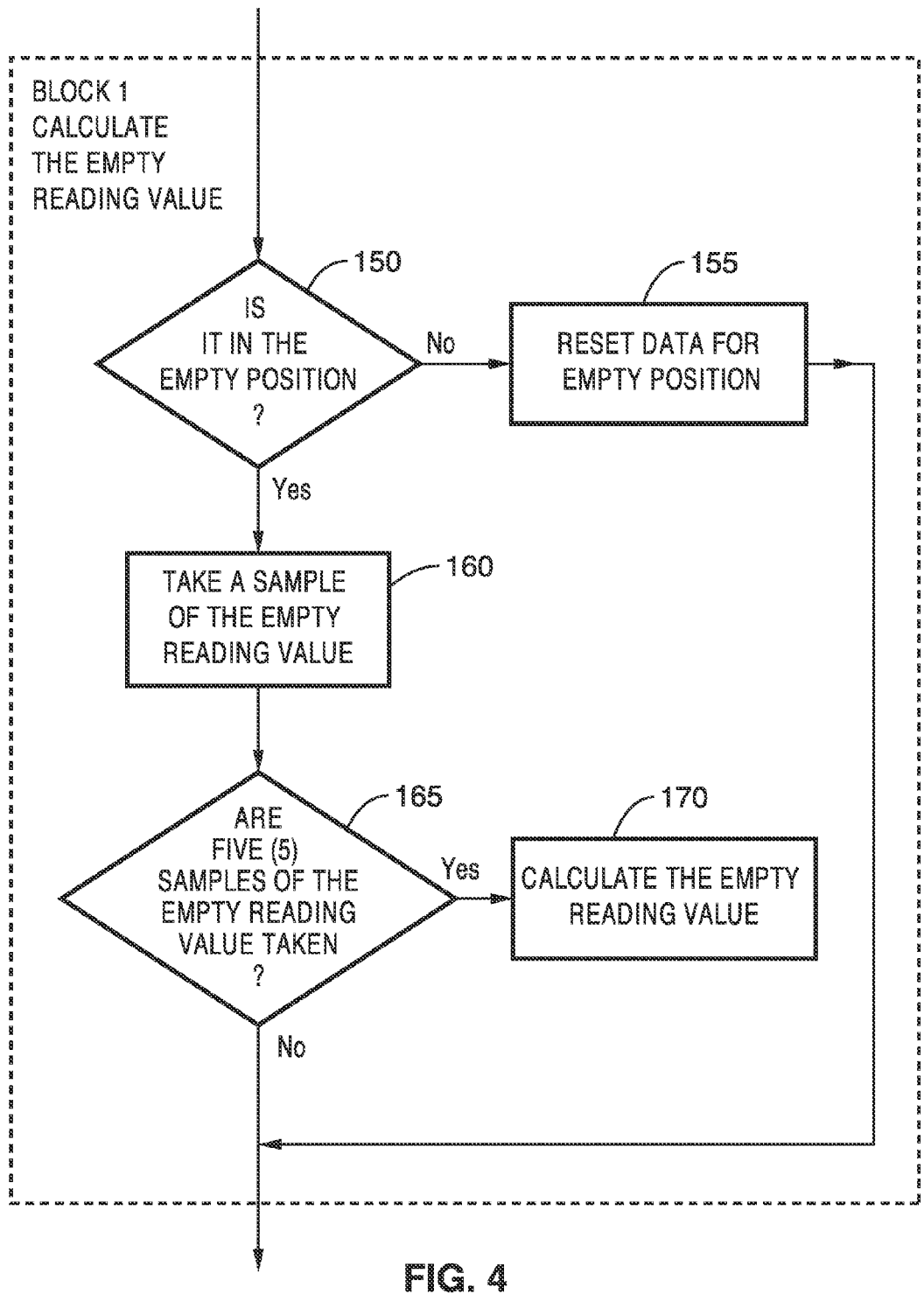
Figure 5:
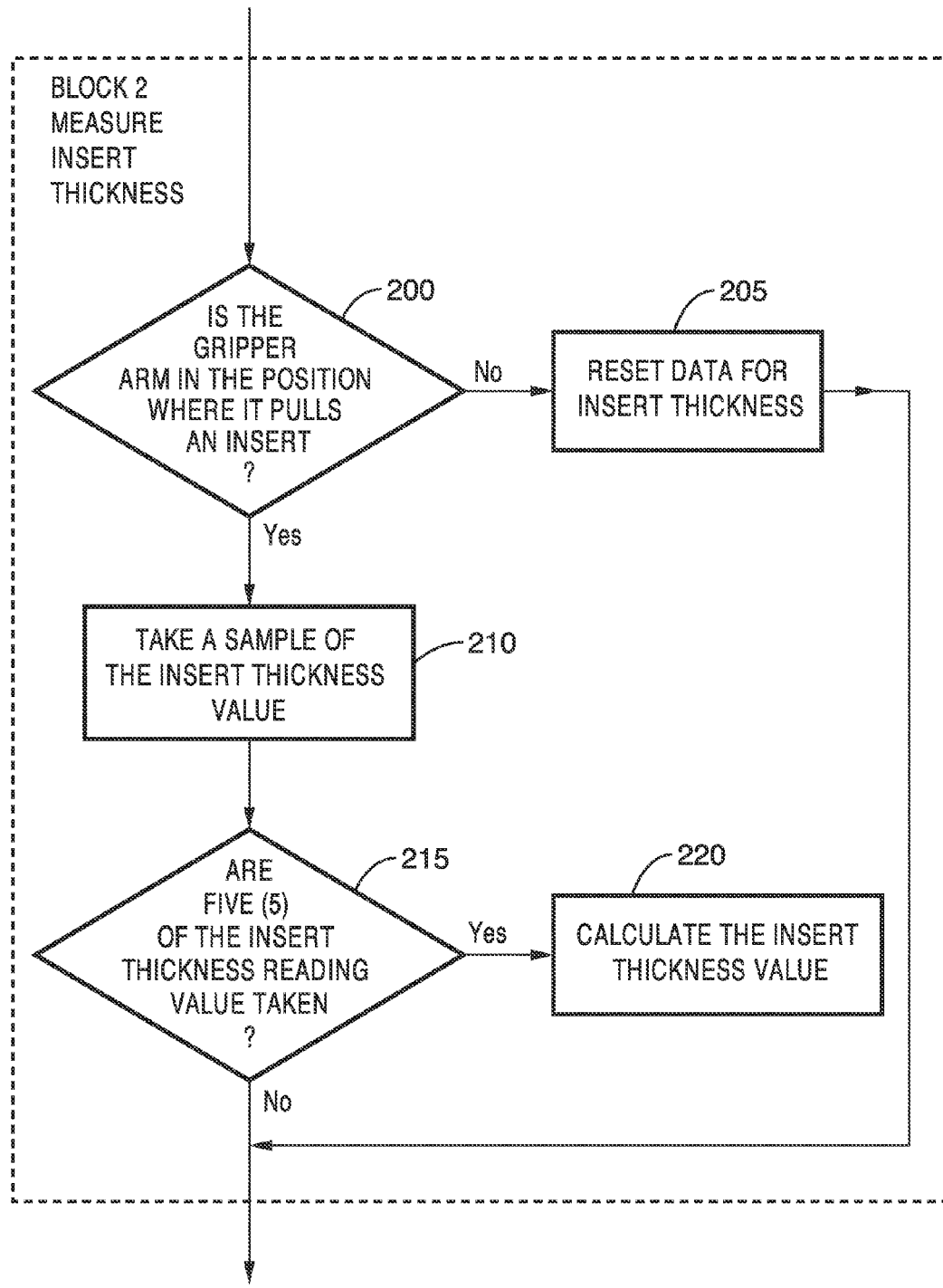
Figure 6:
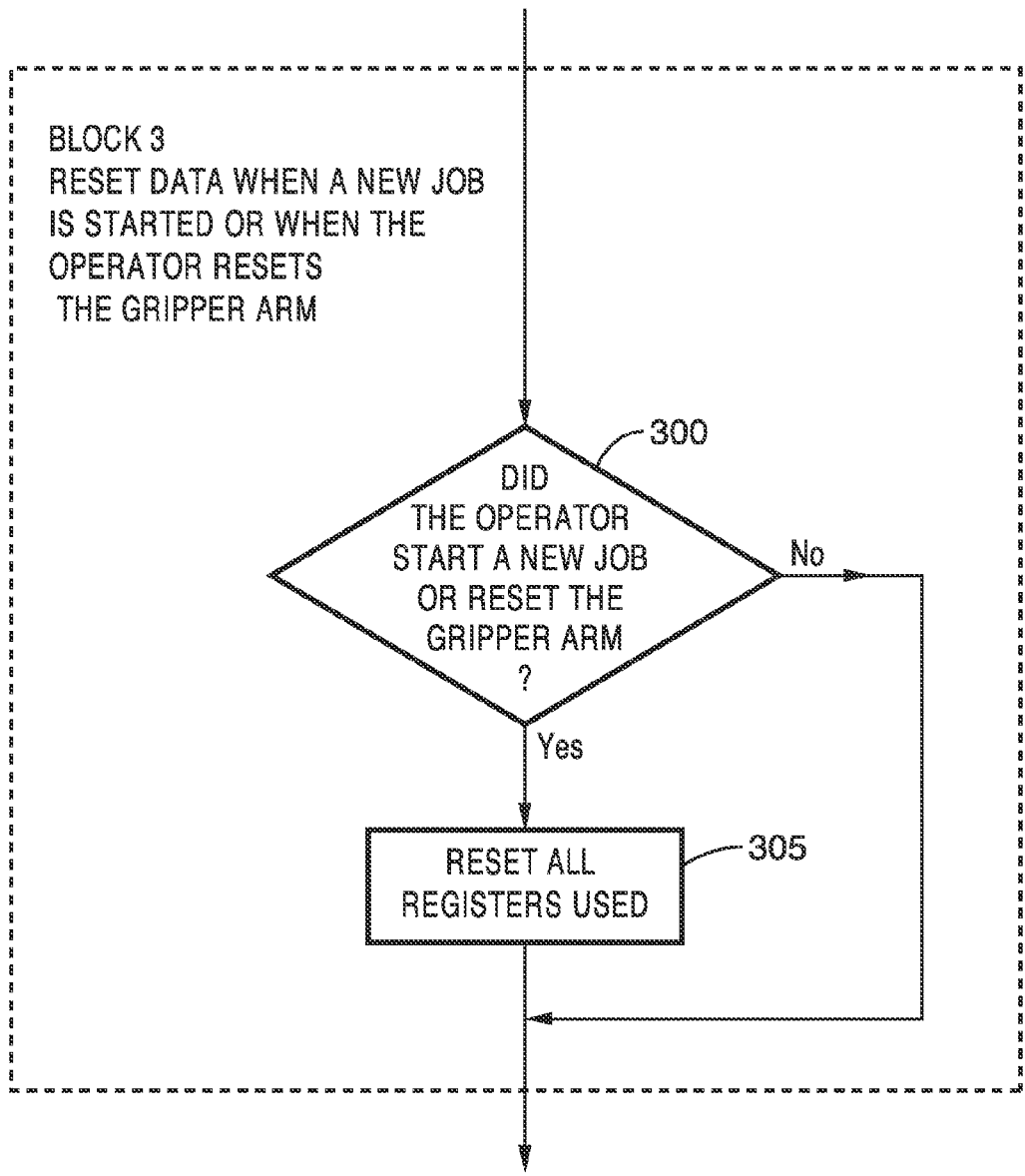
Figure 7:
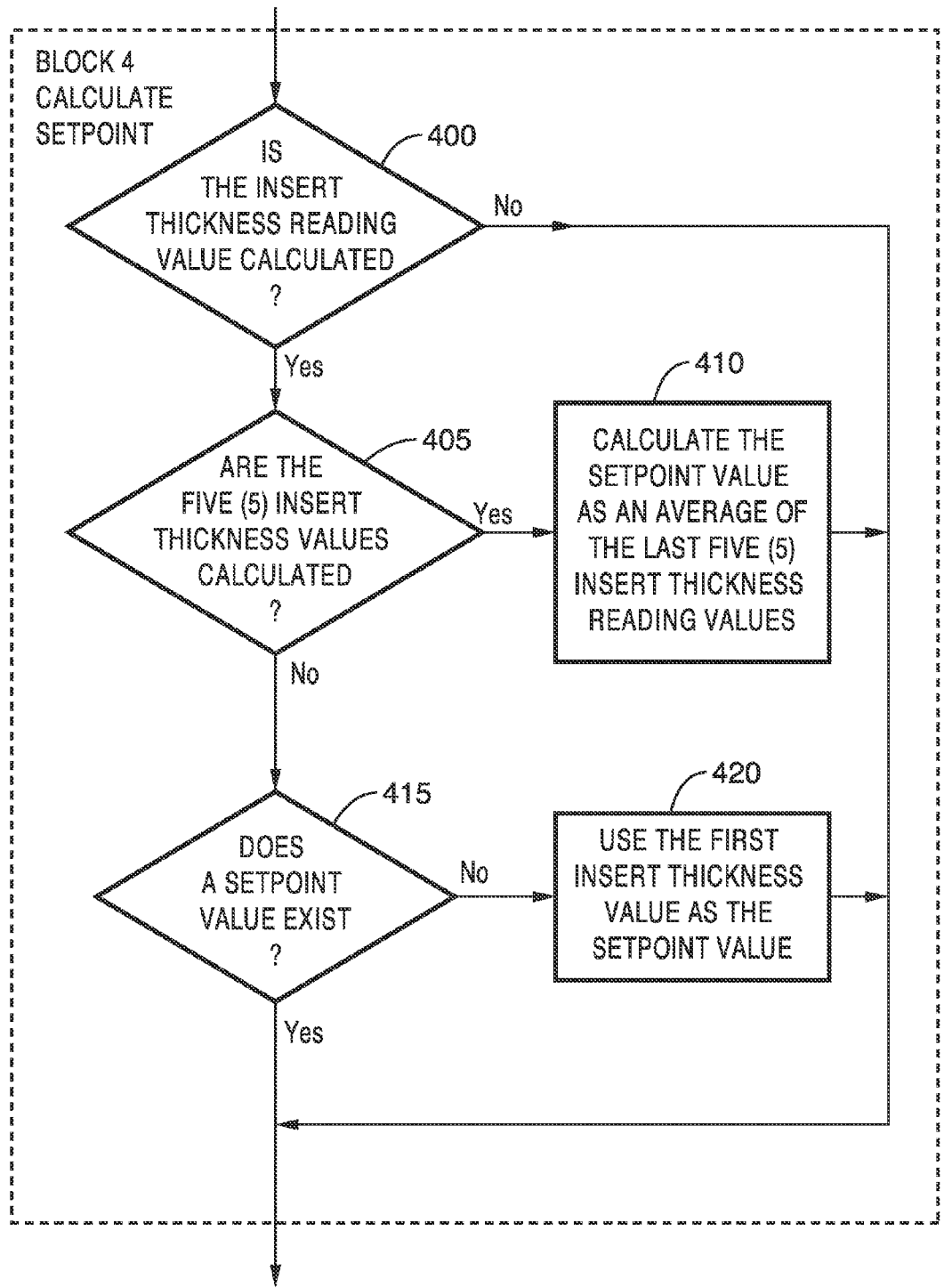
Figure 8:
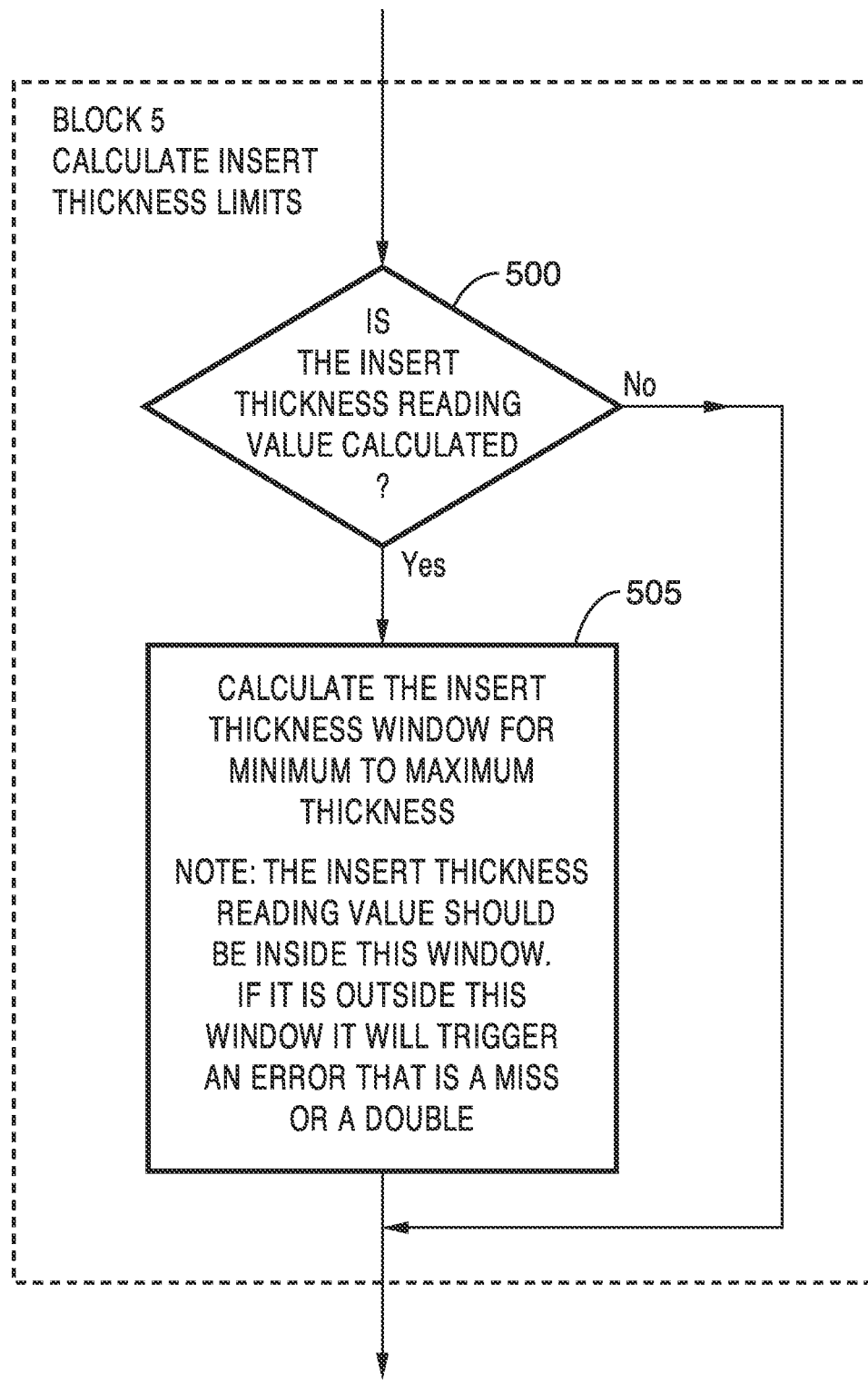
Figure 9:
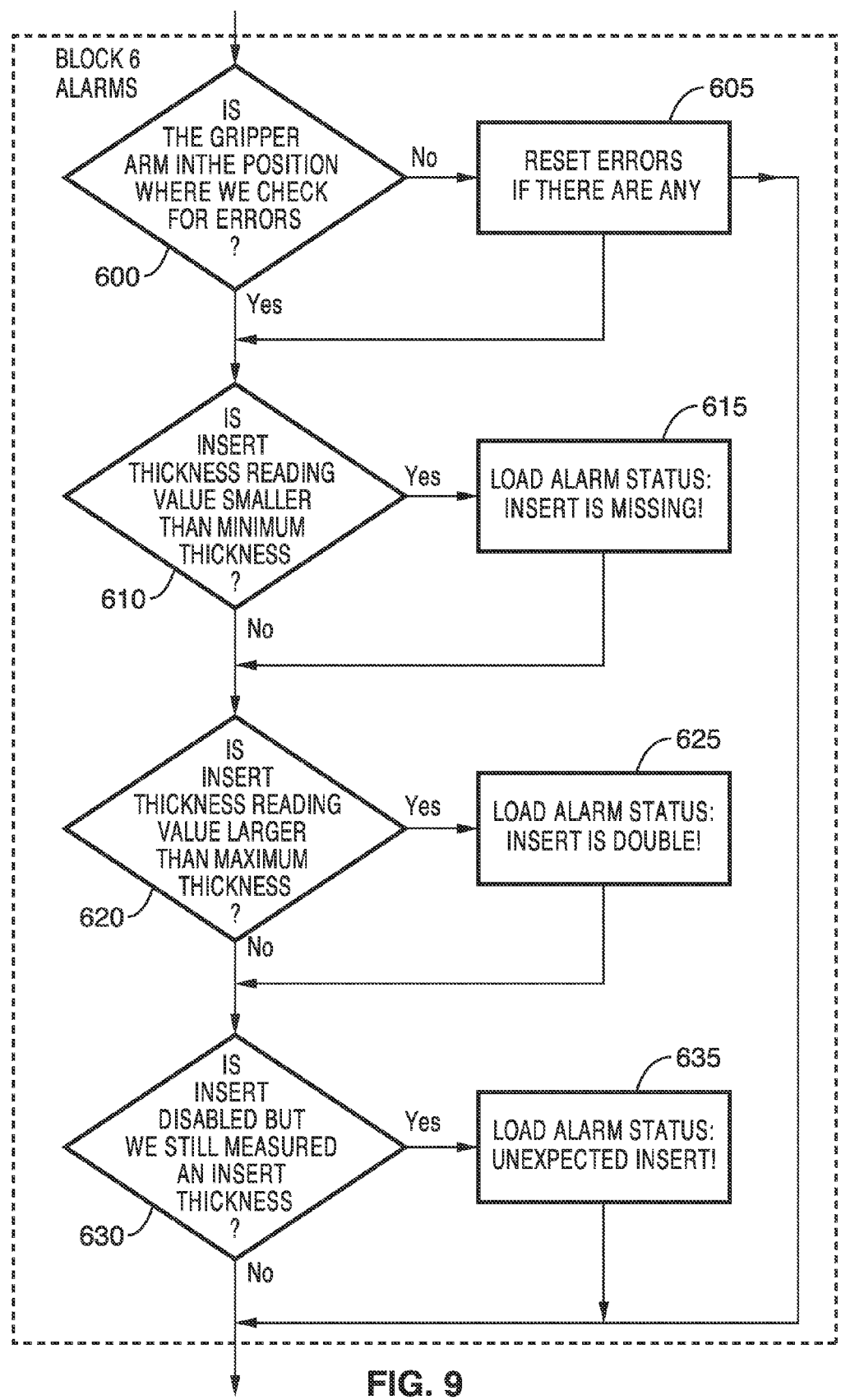
Figure 10:
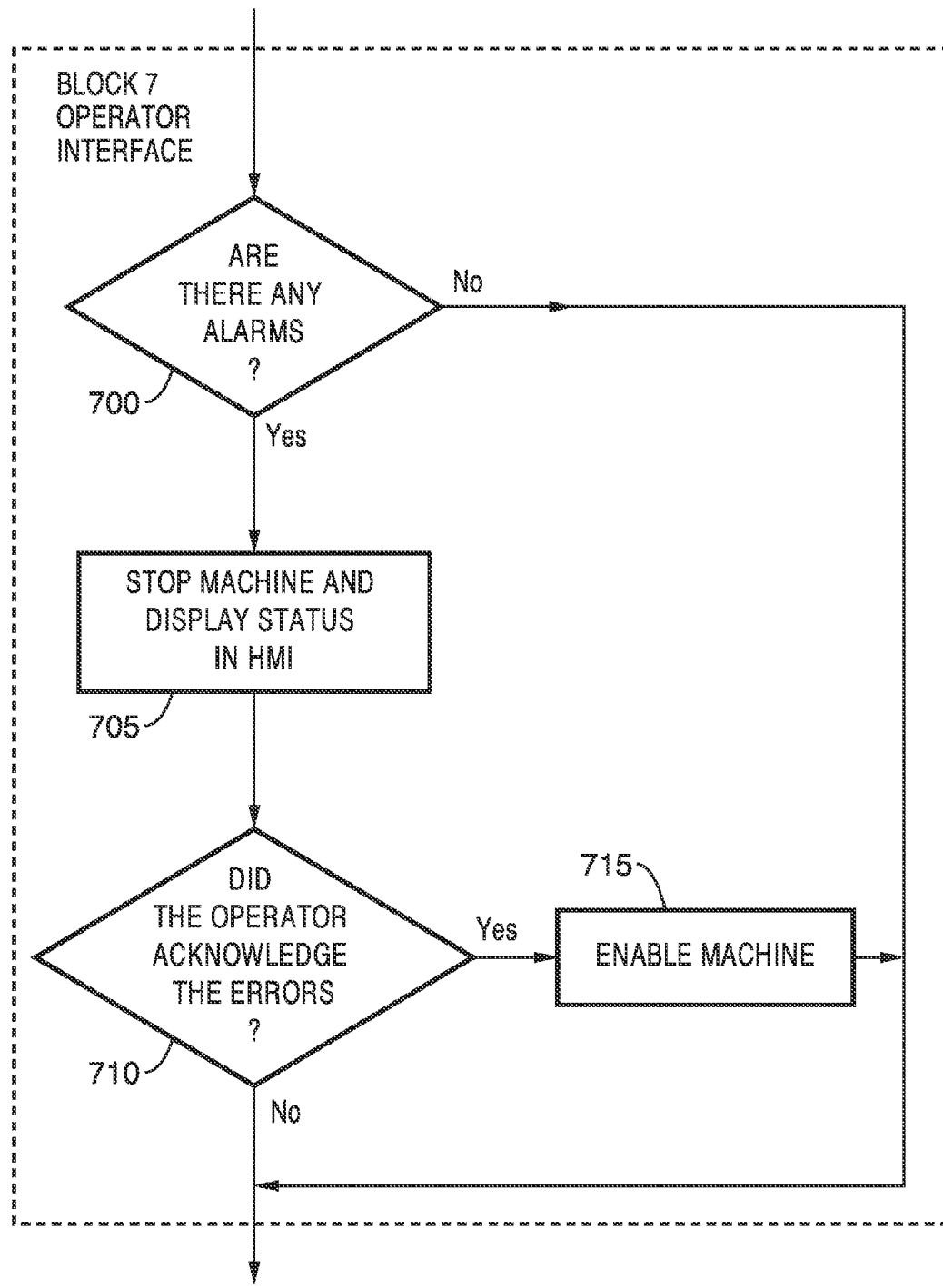

FIG. 4 shows the details for subroutine Block 1 in FIG. 3.
FIG. 5 shows the details for subroutine Block 2 of FIG. 3.
FIG. 6 shows the details for subroutine Block 3 of FIG. 3.
FIG. 7 shows the details for subroutine Block 4 of FIG. 3.
FIG. 8 shows the details for subroutine Block 5 of FIG. 3.
FIG. 9 shows the details for subroutine Block 6 of FIG. 3.
FIG. 10 shows the details for subroutine Block 7 of FIG. 3.

DETAILED DESCRIPTION OF THE INVENTION

Referring now to FIG. 1 through FIG. 10, there is shown a preferred embodiment of a device for detecting the thickness of a sheet of material such as paper, cloth, plastic, and equivalent natural and synthetic substances, including a mailing insert that is picked by a gripper jaw assembly from a stack of insert sheets to determine if one or more sheets have been picked. Frequently, the subject invention is employed on a mail inserting machine to detect a missing insert or double insert errors by means of a light sensor facilitated process.

The subject detection system is needed since current manual set up methods to detect a miss or double insert pull on a mailing machine usually involve placing the insert into the picking jaw and adjusting two mechanically actuated sensors. One sensor detects the picking jaw opening too little, which correlates to a miss, and the other sensor detects the picking jaw opening too much, which correlates to a double pull. Inserter machines select desired inserts from hoppers, via picker arm assembles, and place them into a mailing envelope. Multiple identical inserts placed into the same mailing envelope wastes time and resources and a missing insert then fails to provide required information to the mail envelope recipient. On a typical mailing machine there are often six or more insert stations to set up, which can take several minutes before beginning a new job. A reliable and accurate automated method to detect missing or double inserts, such as the subject invention, reduces downtime and eliminates operator error by avoiding this manual set up procedure. Other methods for determining thickness have been developed and patented for automated miss/double insert detection but to our knowledge this is possibly the first method using a light sensor. Using the light sensor method is more accurate than existing automated methods which allow better control and programmable variance setting limits as well as data collection.

Figure 1:
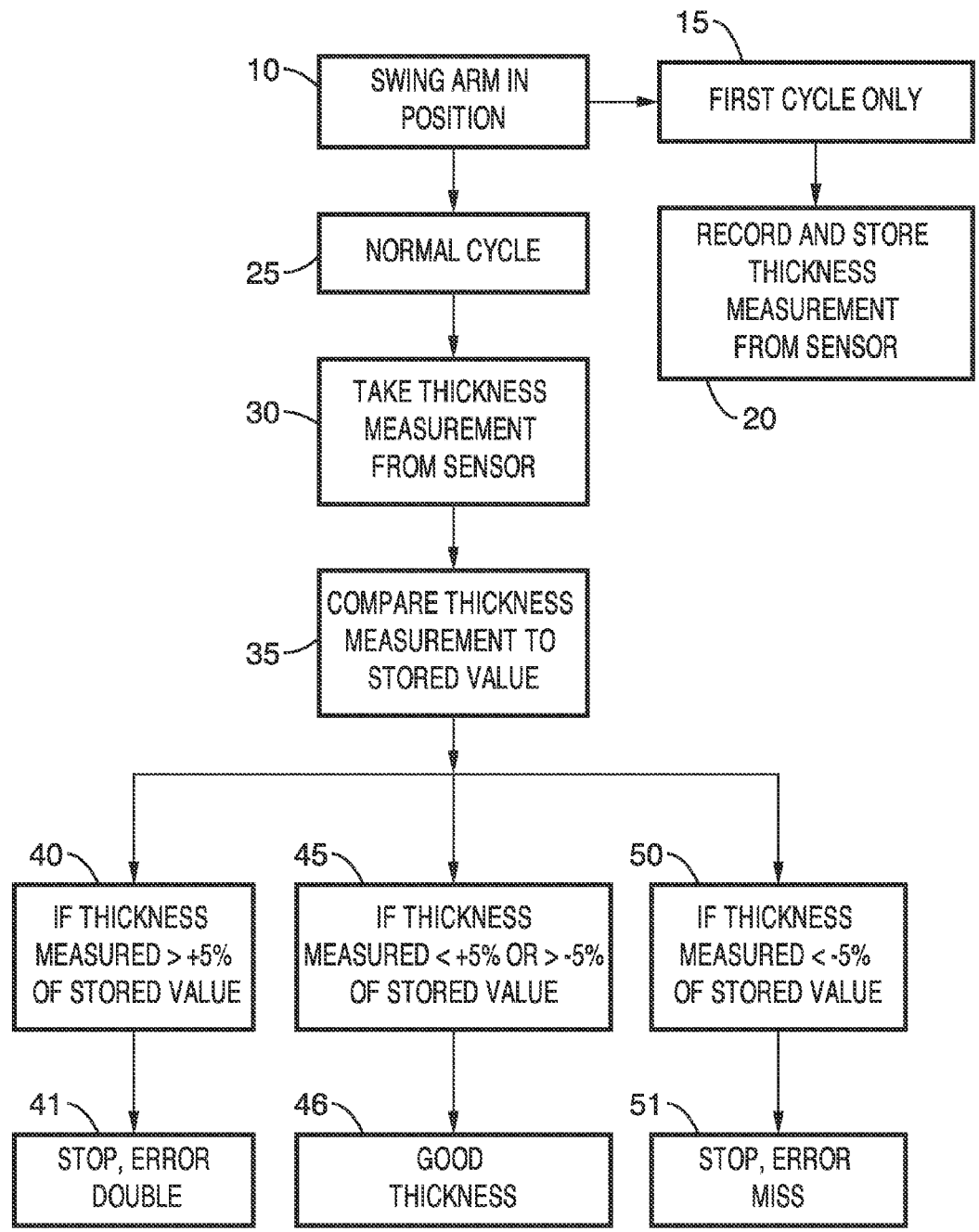
FIG. 1 is a general flow diagram for the programming steps in the subject thickness determination.

FIG. 1 discloses the general flow diagram that depicts the subject thickness measurement system that utilizes a light sensor adapted picker jaw assembly. The analysis system utilizes the light sensor-adapted picking arm seen in FIG. 2 to take thickness measurements for inserts. The picking arm is moved into position 10 for determining the insert thickness and during the first cycle 15 measures and records the standard insert thickness from light sensor input 20 data. The normal picking cycle is started 25 and each insert thickness is measured 30. The thickness of the measured insert is compared to the thickness of the standard insert that was measured and stored 35. Three outcomes are evaluated in flow diagram steps 40-41, 45-46, and 50-51. In steps 40-41 the measured insert is >+5% of the stored standard thickness value which indicates a double error and a stop is ordered. In steps 45-46 the measured insert is between <+5% and >−5% of the stored standard thickness value which indicates the insert picked is satisfactory/good. In steps 50-51 the measured insert is <−5% of the stored standard thickness value which indicates the insert picked is too thin and a miss is noted that stops the process.

Figure 2:
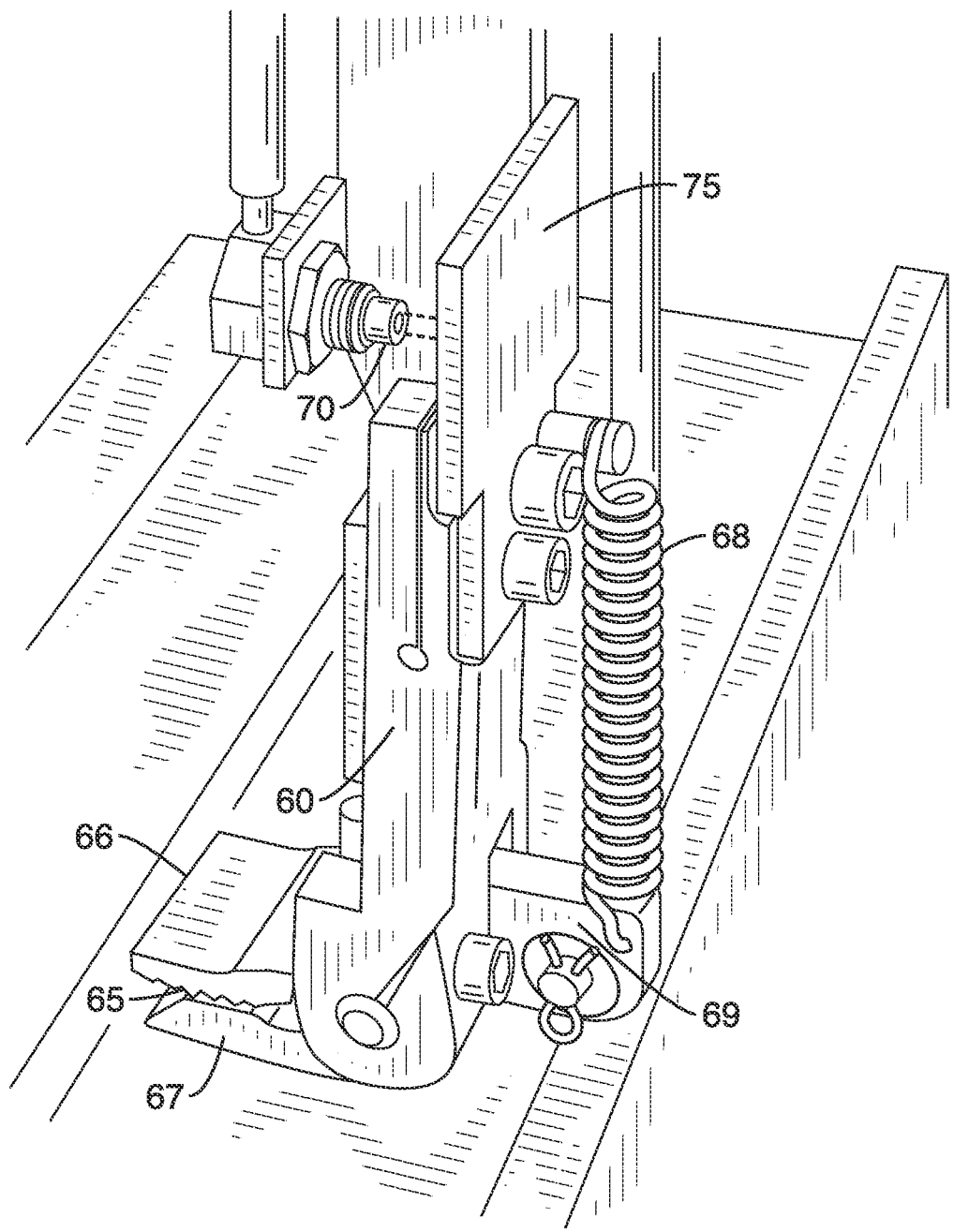
FIG. 2 is a perspective view of the subject invention showing the light sensor, reflective target plate, and associated resilient means and jaw components.

FIG. 2 shows a picture of one embodiment of the subject invention in which a picker arm is adapted with a light sensor and fulcrum associated reflective member. Shown is a typical inserter machine (background in picture) in which a picker arm assembly comprises a picker arm 60, picker jaw 65 having a movable upper jaw 66 and a fixed lower jaw 67 (although it is within the realm of this invention that the upper jaw is fixed and the lower jaw is movable thereby creating an equivalent device), fulcrum spring 68 that is attached to the movable upper jaw 66 on the opposite side of the fulcrum point 69, light sensor 70, and target plate 75 to which the fulcrum spring 68 is also attached. The picker arm assembly is mounted to the inserter to pick a desired insert from a hopper. Typical inserter machines have at least one and usually a plurality of picker arm assemblies for selecting inserts which are then placed into the mailing envelope. The picker arm 60 rotates into position and picks an insert in its picker jaw 65 that has a fixed lower member 67 and a movable upper member 66. A light sensor 70 is affixed to the upper portion of the picker arm 60 or the bracket holding the picker arm 60 to the inserter. The light sensor 70 both emits a light beam and detects a reflected beam. A target reflective plate 75 is mounted by the fulcrum spring 68 to the picker jaw movable upper member 66. The target reflective plate 75 has a reflective surface that faces the light sensor. The target reflective plate 75 is linked by fulcrum spring 68 to the movable upper jaw 66 via the fulcrum point 69 to ascertain a thickness of an insert material held in the picker jaw 65. When the jaw 65 grips the picked insert the reflective plate 75 moved to a new position and the incoming light beam is deflected in a manner than indicates the thickness of the gripped insert. The deflected returning light beam is recorded and utilized in the programming to evaluate the insert thickness compared to the thickness of a standard insert.

FIG. 3 is a more specific flow diagram than shown in FIG. 1 and indicates the various subroutines carried out in the subject thickness determination process. A Programmable Logic Controller (PLC) is utilized in the subject process and is a programmable computer utilized for automating the subject electromechanical process. The subject process is initiated at the start 100 location in the program. It is immediately determined if the PLC is running 105 and if not the process ends 110, but, if it is running, then the empty reading value is calculated 115. At the next step the insert thickness is measured 120 by means of the light sensor measurement. Following the measurement of the insert thickness 120, the data is reset when a new job is started or when the operator resets the gripper/picker arm 125. Next, the setpoint for the process is calculated 130 before the insert thickness limits are calculated 135. After the thickness limits are calculated 135, any alarms for the system are activated 140 at this step in the subject process. The operator interface step 145 is engaged and then the process loops back to the "Is PLC Running" 105 step.

FIGS. 4-10 show the details for the specific "BLOCKS 1-7" subroutines depicted in FIG. 3. The details of the various subroutines are discussed immediately below.

Block 1 (FIG. 4) details calculating the empty reading value. This subroutine begins with the step of establishing if the PLC is in the empty position 150 and if not, the data is reset for empty position 155, but if it is in the empty position then the process takes a sample of the empty reading value 160. For consistency, five samples of the empty reading value are taken 165. Once five samples are taken the empty reading value is calculated 170. The process then moves on to Block 2 (FIG. 5).

Block 2 (FIG. 5) details the thickness measurement of the selected insert. The process determines if the gripper arm or jaw is in the position where it pulls an insert 200. If the gripper arm is not in the correct position the data is reset for the insert thickness determination 205 and then onto the next subroutine. However, if the position is correct a sample is taken of the insert thickness value 210. The query is asked as to whether or not five samples have been taken for the insert thickness 215 and if so then the insert thickness value is calculated 220 and if not then the process moves on to Block 3 (FIG. 6).

Block 3 (FIG. 6) details the process for resetting the data when a new job is started or when the operator resets the gripper arm. An initial question is asked as to whether or not the operator started a new job or reset the gripper arm 300. If yes, all of the registers used are reset 305 and if no, the process then moves on to Block 4 (FIG. 7).

Block 4 (FIG. 7) details the process for calculating the setpoint. An initial question is posed as to whether or not the insert thickness reading value has been calculated 400 and if not the process then moves on to Block 5 (FIG. 8), but if it has been then it is established if there are five insert thickness values that have been calculated 405. If five values have been calculated then the setpoint value is calculated as an average of the last five insert thickness reading values 410 and the process continues to Block 5. If five values have not been calculated then it is determined if a setpoint value exists 415 and if yes, the process continues to Block 5, but if no, then the first insert thickness value is used as the setpoint value 420 and the process moves on to Block 5.

Block 5 (FIG. 8) details the calculations for determining the insert thickness limits. First, it is established if the insert thickness reading value is calculated 500 and if not then the process continues on to Block 6 (FIG. 9). If the insert thickness reading value is calculated then the insert thickness window for minimum to maximum thickness is calculated 505. It is noted that the insert thickness reading value should be inside this window and if it is outside this window it will trigger an error that is termed a "miss" or "double". The process then moves on to Block 6 (FIG. 9).

Block 6 (FIG. 9) details the process for generating the various "problem" alarms. To start the process a query is made as to whether or not the gripper arm is in the position where errors are determined 600 and if not, then any errors are reset 605. If the gripper arm is in the correct position for checking errors then it is determined if the insert thickness reading value is smaller than the minimum thickness 610 and if yes, then an alarm is loaded that states that an insert is missing 615 and the process continues. If the insert thickness reading value is not smaller than the minimum thickness then it is determined if the insert thickness reading value is larger than the maximum thickness 620 and if yes, then an alarm is loaded that states that the insert is double 625 and the process continues. If the insert thickness reading value is not larger than the maximum thickness then it is determined if the insert is disabled but an insert thickness was still measured 630 and if yes, an alarm is loaded that stated there is a unexpected insert present 635, but if not, then the process moves on to Block 7 (FIG. 10).

Block 7 (FIG. 10) details the interface utilized to notify the operator as to what is occurring in the thickness measurement process. First, it is determined if any alarms are activated 700 and if not, the process continues. If alarms are activated the machine is stopped and the display status is shown in HMI (a Human-Machine Interface display system) 705 for the operator to interpret. It is then established if the operator acknowledged the error alarms 710 and if yes, the machine is enabled 715. If no, then the programming loops back to the starting point in the process.

In conclusion, the subject invention is an apparatus and method for detecting the thickness of a sheet of material, including an insert that is picked for inclusion in a mailing envelope. The subject invention broadly includes controlling software and a picker jaw assembly that comprises a picker arm having first and second ends, an insert gripping picker jaw mounted to the picker arm first end having a first fixed jaw member and a second movable jaw member, a fulcrum point about which the second movable jaw member pivots during an insert gripping process between a closed empty position and an insert gripping open position, a target plate having a light reflective surface and secured to the second picker arm end, picker jaw-to-target plate attachment means whereby when the second movable jaw member moves when gripping the insert and the target plate shifts in position, and a light sensor mounted proximate the picker arm second end that emits a light beam and receives a reflected light beam that is reflected back from the light reflective surface. Additionally, the subject invention includes and a controller having programming that correlates the target plate position movement into a thickness determination for the insert gripped by the picker jaw by means of the included programs and subroutines.

Embodiments of the present invention may be described with reference to equations, algorithms, and/or flowchart illustrations of methods according to embodiments of the invention. These methods may be implemented using computer program instructions executable on a computer. These methods may also be implemented as computer program products either separately, or as a component of an apparatus or system. In this regard, each equation, algorithm, or block or step of a flowchart, and combinations thereof, may be implemented by various means, such as hardware, firmware, and/or software including one or more computer program instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create means for implementing the functions specified in the equation(s), algorithm(s), and/or flowchart(s).

Accordingly, the equations, algorithms, and/or flowcharts support combinations of means for performing the specified functions, combinations of steps for performing the specified functions, and computer program instructions, such as embodied in computer-readable program code logic means, for performing the specified functions. It will also be understood that each equation, algorithm, and/or block in flowchart illustrations, and combinations thereof, may be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer readable memory that can direct a computer or other programmable processing apparatus to function in a particular manner, such that the instructions stored in the computer-readable memory produce an article of manufacture including instruction means which implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the equation(s), algorithm(s), and/or block(s) of the flowchart(s).

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

From the discussion above it will be appreciated that the invention can be embodied in various ways, including the following:

1. An apparatus for detecting the thickness of a sheet of material that is picked for subsequent processing, comprising: a) a picker jaw assembly, comprising: i) a picker arm having first and second ends; ii) a sheet gripping picker jaw mounted to said picker arm first end having a first fixed jaw member and a second movable jaw member; iii) a fulcrum point about which said second movable jaw member pivots during a sheet gripping process between a closed empty position and a sheet gripping open position; iv) a target plate having a light reflective surface and secured to said second picker arm end; v) picker jaw-to-target plate attachment means whereby when said second movable jaw member moves when gripping the sheet said target plate shifts in position; and vi) a light sensor mounted proximate said picker arm second end that emits a light beam and receives a reflected light beam that is reflected back from said light reflective surface; and b) a controller having programming that correlates said target plate position movement into a thickness determination for the sheet gripped by said picker jaw.

2. The apparatus of any preceding embodiment, wherein said picker jaw-to-target plate attachment means comprises a resilient means.

3. The apparatus according to claim 1, wherein said picker jaw-to-target plate attachment means comprises a spring.

4. An apparatus for detecting the thickness of an insert that is picked for inclusion in a mailing envelope, comprising: a) a picker jaw assembly, comprising: i) a picker arm having first and second ends; ii) an insert gripping picker jaw mounted to said picker arm first end having a first fixed jaw member and a second movable jaw member; iii) a fulcrum point about which said second movable jaw member pivots during an insert gripping process between a closed empty position and an insert gripping open position; iv) a target plate having a light reflective surface and secured to said second picker arm end; v) picker jaw-to-target plate attachment means whereby when said second movable jaw member moves when gripping the insert said target plate shifts in position; and vi) a light sensor mounted proximate said picker arm second end that emits a light beam and receives a reflected light beam that is reflected back from said light reflective surface; and b) a controller having programming that correlates said target plate position movement into a thickness determination for the insert gripped by said picker jaw.

5. The apparatus of any preceding embodiment, wherein said picker jaw-to-target plate attachment means comprises a resilient means.

6. The apparatus of any preceding embodiment, wherein said picker jaw-to-target plate attachment means comprises a spring.

7. An apparatus for detecting the thickness of an insert that is picked for inclusion in a mailing envelope, comprising: a) a picker jaw assembly, comprising: i) a picker arm having first and second ends; ii) an insert gripping picker jaw mounted to said picker arm first end having a first fixed jaw member and a second movable jaw member; iii) a fulcrum point about which said second movable jaw member pivots during an insert gripping process between a closed empty position and an insert gripping open position; iv) a target plate having a light reflective surface and secured to said second picker arm end; v) picker jaw-to-target plate attachment means whereby when said second movable jaw member moves when gripping the insert said target plate shifts in position; and vi) a light sensor mounted proximate said picker arm second end that emits a light beam and receives a reflected light beam that is reflected back from said light reflective surface; and b) a controller having programming that correlates said target plate position movement into a thickness determination for the insert gripped by said picker jaw, wherein said programming comprises the steps: i) calculating an empty reading value; ii) measuring a thickness of the selected insert; iii) resetting data when a new job is started or when an operator resets the gripper arm; iv) calculating a setpoint for said thickness measurements; v) determining insert thickness limits; vi) generating various problem alarms; and vii) creating an interface utilized to notify the operator as to what is occurring in the thickness measurement process.

8. A method for detecting the thickness of a sheet of material that is picked for subsequent processing, comprising the steps of: a) collecting thickness data employing a picker jaw assembly, comprising: i) a picker arm having first and second ends; ii) a sheet gripping picker jaw mounted to said picker arm first end having a first fixed jaw member and a second movable jaw member; iii) a fulcrum point about which said second movable jaw member pivots during a sheet gripping process between a closed empty position and a sheet gripping open position; iv) a target plate having a light reflective surface and secured to said second picker arm end; v) a picker jaw-to-target plate attachment means whereby when said second movable jaw member moves when gripping the sheet said target plate shifts in position; and vi) a light sensor mounted proximate said picker arm second end that emits a light beam and receives a reflected light beam that is reflected back from said light reflective surface; and b) utilizing said collected thickness data in a controller having programming that correlates said target plate position movement into a thickness determination for the sheet gripped by said picker jaw.

9. A method for detecting the thickness of an insert that is picked for inclusion in a mailing envelope, comprising the steps of: a) collecting thickness data employing a picker jaw assembly, comprising: i) a picker arm having first and second ends; ii) an insert gripping picker jaw mounted to said picker arm first end having a first fixed jaw member and a second movable jaw member; iii) a fulcrum point about which said second movable jaw member pivots during an insert gripping process between a closed empty position and an insert gripping open position; iv) a target plate having a light reflective surface and secured to said second picker arm end; v) picker jaw-to-target plate attachment means whereby when said second movable jaw member moves when gripping the insert, said target plate shifts in position; and vi) a light sensor mounted proximate said picker arm second end that emits a light beam and receives a reflected light beam that is reflected back from said light reflective surface; and b) utilizing said collected thickness data in a controller having programming that correlates said target plate position movement into a thickness determination for the insert gripped by said picker jaw.

10. The method of any preceding embodiment, wherein said picker jaw-to-target plate attachment means comprises a resilient means.

11. The method of any preceding embodiment, wherein said picker jaw-to-target plate attachment means comprises a spring.

12. A method for detecting the thickness of an insert that is picked for inclusion in a mailing envelope, comprising the steps: a) collecting thickness data employing a picker jaw assembly, comprising: i) a picker arm having first and second ends; ii) an insert gripping picker jaw mounted to said picker arm first end having a first fixed jaw member and a second movable jaw member; iii) a fulcrum point about which said second movable jaw member pivots during an insert gripping process between a closed empty position and an insert gripping open position; iv) a target plate having a light reflective surface and secured to said second picker arm end; v) picker jaw-to-target plate attachment means whereby when said second movable jaw member moves when gripping the insert, said target plate shifts in position; and vi) a light sensor mounted proximate said picker arm second end that emits a light beam and receives a reflected light beam that is reflected back from said light reflective surface; and b) utilizing said collected thickness data in a controller having programming that correlates said target plate position movement into a thickness determination for the insert gripped by said picker jaw, wherein said programming comprises the steps: i) calculating an empty reading value; ii) measuring a thickness of the selected insert; iii) resetting data when a new job is started or when an operator resets the gripper arm; iv) calculating a setpoint for said thickness measurements; v) determining insert thickness limits; vi) generating various problem alarms; and vii) creating an interface utilized to notify the operator as to what is occurring in the thickness measurement process.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An apparatus for detecting the thickness of a sheet of material that is picked for subsequent processing, comprising:
   a) a picker jaw assembly, comprising:
      i) a picker arm having first and second ends;
      ii) a sheet gripping picker jaw mounted to said picker arm first end having a first fixed jaw member and a second movable jaw member;
      iii) a fulcrum point about which said second movable jaw member pivots during a sheet gripping process between a closed empty position and a sheet gripping open position;
      iv) a target plate having a light reflective surface and secured to said second picker arm end, wherein said target plate deflects away from said picker arm as said picker jaw opens;
      v) picker jaw-to-target plate attachment means whereby when said second movable jaw member moves when gripping the sheet said target plate shifts in position; and
      vi) a light sensor mounted proximate said picker arm second end that emits a light beam and receives a reflected light beam that is reflected back from said light reflective surface on said target plate and
   b) a controller having programming that correlates said target plate position movement away from said picker arm into a thickness determination for the sheet gripped by said picker jaw.

2. The apparatus according to claim 1, wherein said picker jaw-to-target plate attachment means comprises a resilient means.

3. The apparatus according to claim 1, wherein said picker jaw-to-target plate attachment means comprises a spring.

4. An apparatus for detecting the thickness of an insert that is picked for inclusion in a mailing envelope, comprising:
   a) a picker jaw assembly, comprising:
      i) a picker arm having first and second ends;
      ii) an insert gripping picker jaw mounted to said picker arm first end having a first fixed jaw member and a second movable jaw member;
      iii) a fulcrum point about which said second movable jaw member pivots during an insert gripping process between a closed empty position and an insert gripping open position;
      iv) a target plate having a light reflective surface and secured to said second picker arm end, wherein said target plate deflects away from said picker arm as said picker jaw opens;
      v) picker jaw-to-target plate attachment means whereby when said second movable jaw member moves when gripping the insert said target plate shifts in position; and
      vi) a light sensor mounted proximate said picker arm second end that emits a light beam and receives a reflected light beam that is reflected back from said light reflective surface on said target plate and
   b) a controller having programming that correlates said target plate position movement away from said picker arm into a thickness determination for the insert gripped by said picker jaw.

5. The apparatus according to claim 4, wherein said picker jaw-to-target plate attachment means comprises a resilient means.

6. The apparatus according to claim 4, wherein said picker jaw-to-target plate attachment means comprises a spring.

7. An apparatus for detecting the thickness of an insert that is picked for inclusion in a mailing envelope, comprising:
   a) a picker jaw assembly, comprising:
      i) a picker arm having first and second ends;
      ii) an insert gripping picker jaw mounted to said picker arm first end having a first fixed jaw member and a second movable jaw member;
      iii) a fulcrum point about which said second movable jaw member pivots during an insert gripping process between a closed empty position and an insert gripping open position;
      iv) a target plate having a light reflective surface and secured to said second picker arm end;

v) picker jaw-to-target plate attachment means whereby when said second movable jaw member moves when gripping the insert said target plate shifts in position; and vi) a light sensor mounted proximate said picker arm second end that emits a light beam and receives a reflected light beam that is reflected back from said light reflective surface and b) a controller having programming that correlates said target plate position movement into a thickness determination for the insert gripped by said picker jaw, wherein said programming comprises the steps:

i) calculating an empty reading value;

ii) measuring a thickness of the selected insert;

iii) resetting data when a new job is started or when an operator resets the gripper arm;

iv) calculating a setpoint for said thickness measurements;

v) determining insert thickness limits;

vi) generating various problem alarms; and vii) creating an interface utilized to notify the operator as to what is occurring in the thickness measurement process.

8. A method for detecting the thickness of a sheet of material that is picked for subsequent processing, comprising the steps of:

a) collecting thickness data employing a picker jaw assembly, comprising:

i) a picker arm having first and second ends;

ii) a sheet gripping picker jaw mounted to said picker arm first end having a first fixed jaw member and a second movable jaw member;

iii) a fulcrum point about which said second movable jaw member pivots during a sheet gripping process between a closed empty position and a sheet gripping open position;

iv) a target plate having a light reflective surface and secured to said second picker arm end, wherein said target plate deflects away from said picker arm as said picker jaw opens;

v) picker jaw-to-target plate attachment means whereby when said second movable jaw member moves when gripping the sheet said target plate shifts in position; and vi) a light sensor mounted proximate said picker arm second end that emits a light beam and receives a reflected light beam that is reflected back from said light reflective surface on said target plate and b) utilizing said collected thickness data in a controller having programming that correlates said target plate position movement away from said picker arm into a thickness determination for the sheet gripped by said picker jaw.

9. A method for detecting the thickness of an insert that is picked for inclusion in a mailing envelope, comprising the steps of:

a) collecting thickness data employing a picker jaw assembly, comprising:

i) a picker arm having first and second ends;

ii) an insert gripping picker jaw mounted to said picker arm first end having a first fixed jaw member and a second movable jaw member;

iii) a fulcrum point about which said second movable jaw member pivots during an insert gripping process between a closed empty position and an insert gripping open position;

iv) a target plate having a light reflective surface and secured to said second picker arm end, wherein said target plate deflects away from said picker arm as said picker jaw opens;

v) picker jaw-to-target plate attachment means whereby when said second movable jaw member moves when gripping the insert said target plate shifts in position; and vi) a light sensor mounted proximate said picker arm second end that emits a light beam and receives a reflected light beam that is reflected back from said light reflective surface on said target plate and b) utilizing said collected thickness data in a controller having programming that correlates said target plate position movement away from said picker jaw into a thickness determination for the insert gripped by said picker jaw.

10. The method according to claim 9, wherein said picker jaw-to-target plate attachment means comprises a resilient means.

11. The method according to claim 9, wherein said picker jaw-to-target plate attachment means comprises a spring.

12. A method for detecting the thickness of an insert that is picked for inclusion in a mailing envelope, comprising the steps:

a) collecting thickness data employing a picker jaw assembly, comprising:

i) a picker arm having first and second ends;

ii) an insert gripping picker jaw mounted to said picker arm first end having a first fixed jaw member and a second movable jaw member;

iii) a fulcrum point about which said second movable jaw member pivots during an insert gripping process between a closed empty position and an insert gripping open position;

iv) a target plate having a light reflective surface and secured to said second picker arm end;

v) picker jaw-to-target plate attachment means whereby when said second movable jaw member moves when gripping the insert said target plate shifts in position; and vi) a light sensor mounted proximate said picker arm second end that emits a light beam and receives a reflected light beam that is reflected back from said light reflective surface and b) utilizing said collected thickness data in a controller having programming that correlates said target plate position movement into a thickness determination for the insert gripped by said picker jaw, wherein said programming comprises the steps:

i) calculating an empty reading value;

ii) measuring a thickness of the selected insert;

iii) resetting data when a new job is started or when an operator resets the gripper arm;

iv) calculating a setpoint for said thickness measurements;

v) determining insert thickness limits;

vi) generating various problem alarms; and vii) creating an interface utilized to notify the operator as to what is occurring in the thickness measurement process.

* * * * *